(12) United States Patent
Yamada et al.

(10) Patent No.: US 6,982,397 B2
(45) Date of Patent: Jan. 3, 2006

(54) TIG WELDING APPARATUS AND METHOD

(75) Inventors: Minoru Yamada, Yokohama (JP); Akio Tejima, Yokosuka (JP)

(73) Assignee: Ishikawajima-Harima Heavy Industries Co., Ltd. (JP)

( * ) Notice: Subject to any disclaimer, the term of this patent is extended or adjusted under 35 U.S.C. 154(b) by 68 days.

(21) Appl. No.: 10/741,990

(22) Filed: Dec. 19, 2003

(65) Prior Publication Data

US 2005/0051525 A1 Mar. 10, 2005

(30) Foreign Application Priority Data

Sep. 9, 2003 (JP) ........................................ 2003-316514

(51) Int. Cl.
*B23K 9/09* (2006.01)

(52) U.S. Cl. .................................... 219/130.51; 219/75

(58) Field of Classification Search ............ 219/130.51, 219/137 PS, 75
See application file for complete search history.

(56) References Cited

U.S. PATENT DOCUMENTS

| 3,781,511 | A | * | 12/1973 | Rygiol | ................... | 219/137 PS |
| 4,396,823 | A | * | 8/1983 | Nihei et al. | ............ | 219/130.51 |
| 4,436,982 | A | * | 3/1984 | Kokura et al. | ......... | 219/130.51 |

FOREIGN PATENT DOCUMENTS

| JP | 62-045474 A | * | 2/1987 |
| JP | 2000-079477 | | 3/2000 |

* cited by examiner

*Primary Examiner*—Clifford C. Shaw
(74) *Attorney, Agent, or Firm*—Ostrolenk, Faber, Gerb & Soffen, LLP

(57) ABSTRACT

A TIG welding apparatus comprises; a twin electrode type welding torch 1 having a first and a second welding electrode 1a, 1b arranged approximately parallel and either side of an insulation plate of a predetermined thickness, and a main unit 2 which supplies to the first welding electrode 1a a first welding current varied at a first period F, and to the second welding electrode 1b a second welding current varied at the first period F and at an opposite phase to the variation of the first welding current. The main unit 2 superimposes a variation of a second period fm being shorter than the first period F, onto the first and second welding currents. As a result, the arc current is increased without increasing the welding current.

18 Claims, 2 Drawing Sheets

TIG WELDING APPARATUS AND METHOD

TECHNICAL FIELD

The present invention relates to a TIG welding apparatus and method.

BACKGROUND ART

As is widely known, TIG (Tungsten Inert Gas) welding is a welding method wherein a base metal and a filler wire are melted by means of an arc discharge generated between the base metal and a tungsten electrode of a welding torch, and an insert gas such as argon gas is blown onto the weld pool to provide an atmosphere of inert gas around the weld pool. The welding torch employed in TIG welding is either a single electrode type in which one electrode is used, or a twin electrode type in which two electrodes are used.

In the case of TIG welding employing the twin electrode type welding torch, a phenomenon occurs where the arcs generated at each electrode are electromagnetically attracted and concentrated in the welding groove, thus narrowing the range over which the welding groove is melted. In order to rectify this situation, the welding torch is displaced orthogonal to the line of the weld. On the other hand, for example in Japanese Unexamined Patent Application, First Publication No. 2000-079477, there is disclosed an example of a welding method wherein a twin electrode type welding torch is employed. This method applies to one electrode a welding current which varies in pulses at a predetermined period, and furthermore, applies to the other electrode a welding current which varies in pulses at an opposite phase to the variations of the welding current of the one electrode. In this manner, by alternately varying the welding current supplied to each electrode, the electromagnetic attraction between the arcs generated at each electrode is weakened, and concentration of the arc from each electrode in the welding groove is alleviated. As a result, the range over which the welding groove is melted is increased, and the penetration of the welding groove can be stabilized.

However, in the case of welding at an attitude other than downwards, the force (the retaining force) supporting the weld pool against the force of gravity is comprised primarily of the surface tension of the weld pool, and the arc pressure, and the weld pool is held at the welding groove by the balance of these forces. If the welding attitude is changed to other than downwards, for example from downwards to upwards, a phenomenon occurs wherein the balance between the force of gravity and the retaining force is lost and the molten metal dribbles from the weld pool. Therefore, welding efficiency is kept low, and the weld pool must be reduced in size. On the other hand, methods where the arc pressure is increased by increasing the welding current in order to inhibit dribbling of the molten metal have been considered. However if the arc pressure is concentrated at a specific site in the weld pool, a localized depression is formed in the surface of the weld pool. Therefore it is impossible to effectively inhibit the aforementioned dribbling phenomenon. Hence, in order to effectively inhibit the dribbling phenomenon by increasing the arc pressure it is necessary to disperse the arc pressure over a wider range of the weld pool.

Moreover when inhibiting the dribbling phenomenon by increasing arc pressure, it is undesirable to bring about an increase in arc current. Arc pressure is primarily attributable to the flow of arc plasma towards the weld pool, and increases with welding current. However, increasing welding current also increases heat input into the weld, promoting melting of the base metal and resulting in an increase in the size of the weld pool. Therefore, the supply of filler wire must be reduced by that amount, so that welding efficiency is reduced. Consequently, in order to increase the efficiency of welding work, it is desirable to be able to increase arc pressure without increasing welding current.

DISCLOSURE OF THE INVENTION

The present invention addresses the aforementioned circumstances, with the object of resolving the following problems.

(1) Dispersion of arc pressure over a wider range of the weld pool.

(2) Increasing arc pressure without increasing welding current.

(3) Preventing dribbling of molten metal from the weld pool.

(4) Improving welding quality.

(5) Improving efficiency of welding work.

To achieve the above object, the present application provides a TIG welding apparatus in the form described below. In other words, in a TIG welding apparatus comprising; a twin electrode type welding torch having a first and a second welding electrode arranged approximately parallel and either side of an insulation plate of a predetermined thickness, and a main unit which supplies to the first welding electrode a first welding current varied at a first period, and to the second welding electrode a second welding current varied at the first period and at an opposite phase to the variation of the first welding current, the main unit superimposes a variation of a second period being shorter than the first period, onto the first and second welding currents.

In the aforementioned TIG welding apparatus, the main unit either adjusts variable attributes of the second period of the first and second welding currents, or adjusts a phase difference between the variation of the second period of the first welding current and the variation of the second period of the second welding current, as one variable attribute of the second period, or when the main unit adjusts a magnitude correlation of the variable amplitude of the second period of the first welding current and the variable amplitude of the second period of the second welding current as one variable attribute of the second period, the main unit adjusts the value of the second period as one variable attribute of the second period.

On the other hand, the first and second welding electrodes are plate electrodes arranged either side of, and approximately parallel to, an insulation plate, with outer faces inclined in relation to faces (inner faces) opposite the insulation plate, in order to form a predetermined tip angle for each. A wire supply apparatus which pays out filler wire from a direction of movement of the twin electrode type welding torch, or from an opposite direction to movement of the twin electrode type welding torch is further provided. Moreover, the variation of the first period is a variation which alternately repeats between a high current level and a low current level, and the main unit is also able to set a variable amplitude of the second period for the high current level, and a variable amplitude of the second period for the low current level, independently. Here, the first and second welding currents are DC currents.

The present application provides a TIG welding method using the aforementioned TIG welding apparatus. In other words, in the case where welding is performed by supplying to each of a first and a second welding electrode of a twin electrode type welding torch, first and second welding currents with mutually differing phases and which vary in a first period, a method is possible involving superimposing a variation in the second period being shorter than the first period, on the first and second welding currents. In this case, the variable attributes of the second period of the first and second welding currents may also be adjusted for welding, and a phase difference between the variation of the second period of the first welding current and the variation of the second period of the second welding current may be also adjusted as one variable attribute of the second period. Moreover, adjusting a magnitude correlation of a variable amplitude of the second period of the first welding current and a variable amplitude of the second period of the second welding current, as one variable attribute of the second period is also effective. On the other hand, as one variable attribute of the second period, the value of the second period may be adjusted.

Furthermore, the aforementioned method uses plate electrodes for the first and second welding electrodes, arranged either side of, and approximately parallel to, an insulation plate, with outer faces inclined in relation to faces (inner faces) opposite the insulation plate in order to form a predetermined tip angle for each. Moreover, a method of paying out filler wire from a direction of movement of the twin electrode type welding torch, or from an opposite direction to movement of the twin electrode type welding torch, is also adopted. Furthermore, the variation in the first period is a variation which alternately repeats between a high current level and a low current level, and a variable amplitude of the second period for the high current level, and a variable amplitude of the second period for the low current level, may also be set independently. In this case also, the first and second welding currents are DC currents.

Such an apparatus and method allows dispersion of a large arc pressure over a wider range of the weld pool without increasing the welding current, with the result that dribbling of the molten metal is inhibited, thus allowing improved weld quality and improved efficiency of welding work. Moreover, adjustment of the variable attributes of the second period of the first and second welding currents allows a variety of settings of arc pressure from high to low, thus allowing more effective inhibition of the phenomenon of dribbling of the molten metal.

BEST MODE FOR CARRYING OUT THE INVENTION

The following describes an embodiment of the present invention with reference to the drawings.

Figure 1:
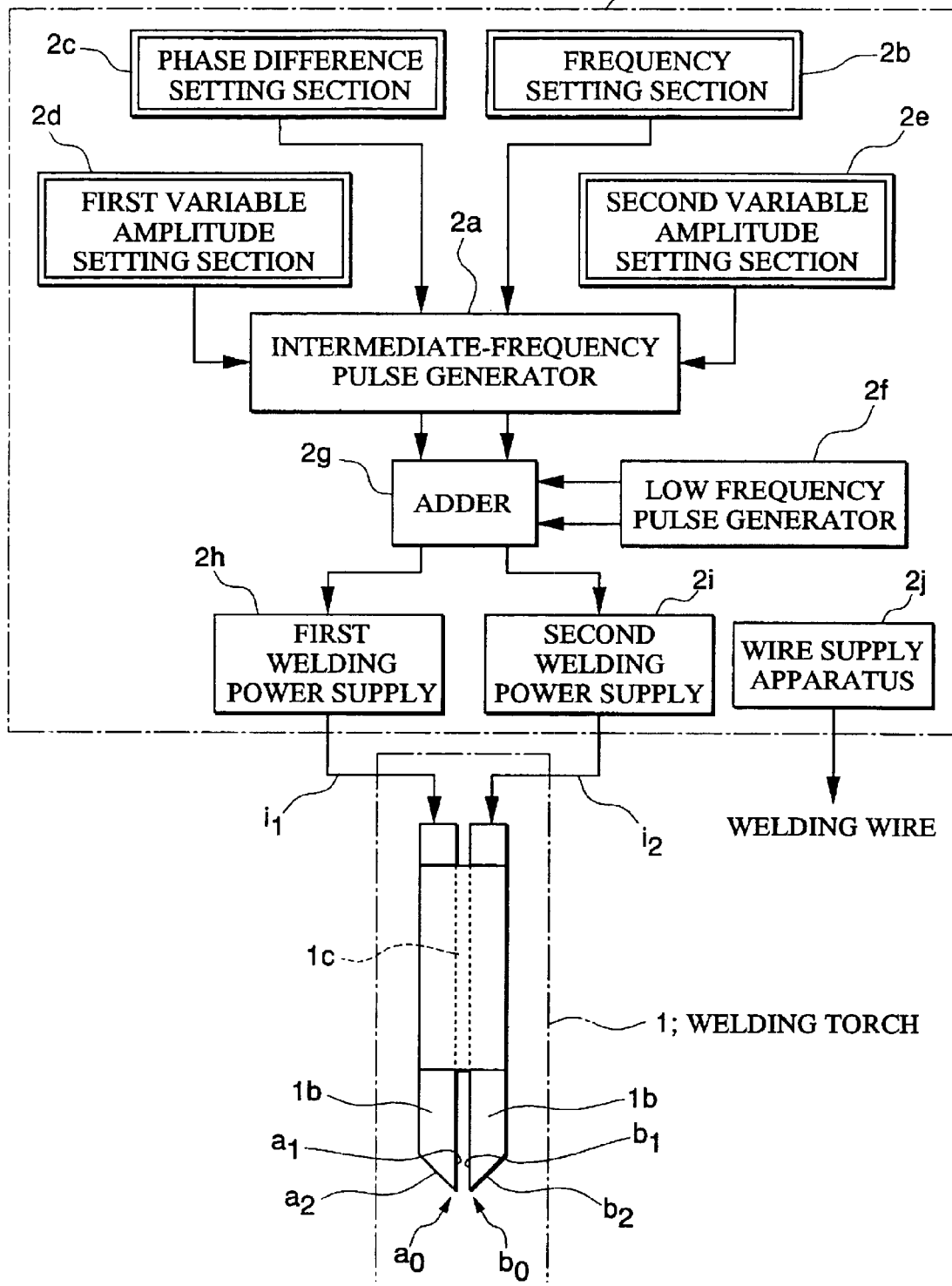
FIG. 1 is a block diagram of a TIG welding apparatus according to an embodiment of the present invention.

FIG. 1 is a block diagram illustrating the configuration of the primary components of a TIG welding apparatus according to the present embodiment. As shown in this figure, the TIG welding apparatus comprises a welding torch 1 and a main unit 2, the welding torch 1 being a twin electrode type welding torch comprising a first welding electrode 1a and a second welding electrode 1b. The first welding electrode 1a and the second welding electrode 1b are plate electrodes arranged either side of an insulation plate 1c, and thus parallel and at a predetermined distance apart. Furthermore, outer faces a2 and b2 of tips a0 and b0 of the first welding electrode 1a and the second welding electrode 1b are inclined in relation to opposite faces (inner faces a1 and b1), both being parallel to the insulation plate 1c, thus forming a predetermined tip angle for each electrode. This tip angle is set to the same angle for both the first welding electrode 1a and the second welding electrode 1b. For example, an angle of 60° or less is desirable.

The following describes the main unit 2. As shown in the figure, the main unit 2 comprises; an intermediate frequency pulse generator 2a, a frequency setting section 2b, a phase difference setting section 2c, a first variable amplitude setting section 2d, a second variable amplitude setting section 2e, a low frequency pulse generator 2f, an adder 2g, a first welding power supply 2h, a second welding power supply 2i, and a wire supply apparatus 2j. The main unit 2 comprising such multiple components is for the supply of individual welding currents to the first welding electrode 1a and the second welding electrode 1b of the welding torch 1. In the following description, a welding current i1 supplied to the first welding electrode 1a is referred to as a first welding current, and a welding current i2 supplied to the second welding electrode 1b is referred to as a second welding current.

The following will be described later in detail. The first and second welding currents i1 and i2 are set as a waveform in which an intermediate frequency pulse (second period variation) of a frequency of approximately 30 to 200 Hz (second period) is superimposed on a low frequency pulse of a frequency of approximately 1 to 10 Hz (first period). The intermediate frequency pulse generator 2a generates the intermediate frequency pulse of the first and second welding currents and outputs it to the adder 2g. The repetition frequency of this intermediate frequency pulse is set to a frequency of approximately 30 to 200 Hz in order to obtain an effective arc pressure on the molten metal of the weld pool. The frequency setting section 2b instructs the frequency setting value of the intermediate frequency pulse, to the intermediate frequency pulse generator 2a. The phase difference setting section 2c instructs the set phase difference between the intermediate frequency pulse of the first welding current and the intermediate frequency pulse of the second welding current, to the intermediate frequency pulse generator 2a.

The first variable amplitude setting section 2d instructs the variable amplitude of the intermediate frequency pulse for the first welding current, to the intermediate frequency pulse generator 2a. The second variable amplitude setting section 2e instructs the variable amplitude of the intermediate frequency pulse for the second welding current, to the intermediate frequency pulse generator 2a. The low frequency pulse generator 2f generates a first welding current low frequency pulse and a second welding current low frequency pulse in mutually opposite phases, and outputs each to the adder 2g. These low frequency pulses are repeated at a duty ratio between high current level and low current level of 50%. The repetition frequency is set to a low frequency of approximately 1 to 10 Hz to obtain effective scanning of each arc generated between the first welding electrode 1a and a welding groove, and the second welding electrode 1b and the welding groove. The attributes of the first welding current low frequency pulse and the second welding current low frequency pulse are exactly the same except for the phase.

The adder 2g is for adding the intermediate frequency pulses input from the intermediate frequency pulse generator 2a and the low frequency pulses input from the low frequency pulse generator 2f. In other words, the adder 2g outputs a signal formed by adding the low frequency pulse of the first welding current and the intermediate frequency pulse of the sane first welding current, to the first welding power supply 2h as a first power supply control signal, and on the other hand outputs a signal formed by adding the low frequency pulse of the second welding current and the intermediate frequency pulse of the same second welding current, to the second welding power supply 2i as a second power supply control signal.

The first welding power supply 2h generates the first welding current i1 based on the first power supply control signal, and outputs it to the first welding electrode 1a, while on the on the other hand, the second welding power supply 2i generates the second welding current i2 based on the second power supply control signal and outputs it to the second welding electrode 1b. The wire supply apparatus 2j is for supplying filler wire to the vicinity of the welding groove. In the present TIG welding apparatus, the welding torch 1 is moved sequentially along the welding groove, thus sequentially welding the groove. However the wire supply apparatus 2j supplies filler wire from the direction of movement of the welding torch 1 (the front of the welding torch 1), or from the opposite direction to movement of the welding torch 1 (the rear of the welding torch 1), towards the welding groove.

Next, operation of the TIG welding apparatus configured in this manner is described in detail with reference to the waveform diagram shown in FIG. 2. This FIG. 2 shows the waveforms of the first welding current i1 and the second welding current i2.

Figure 2:
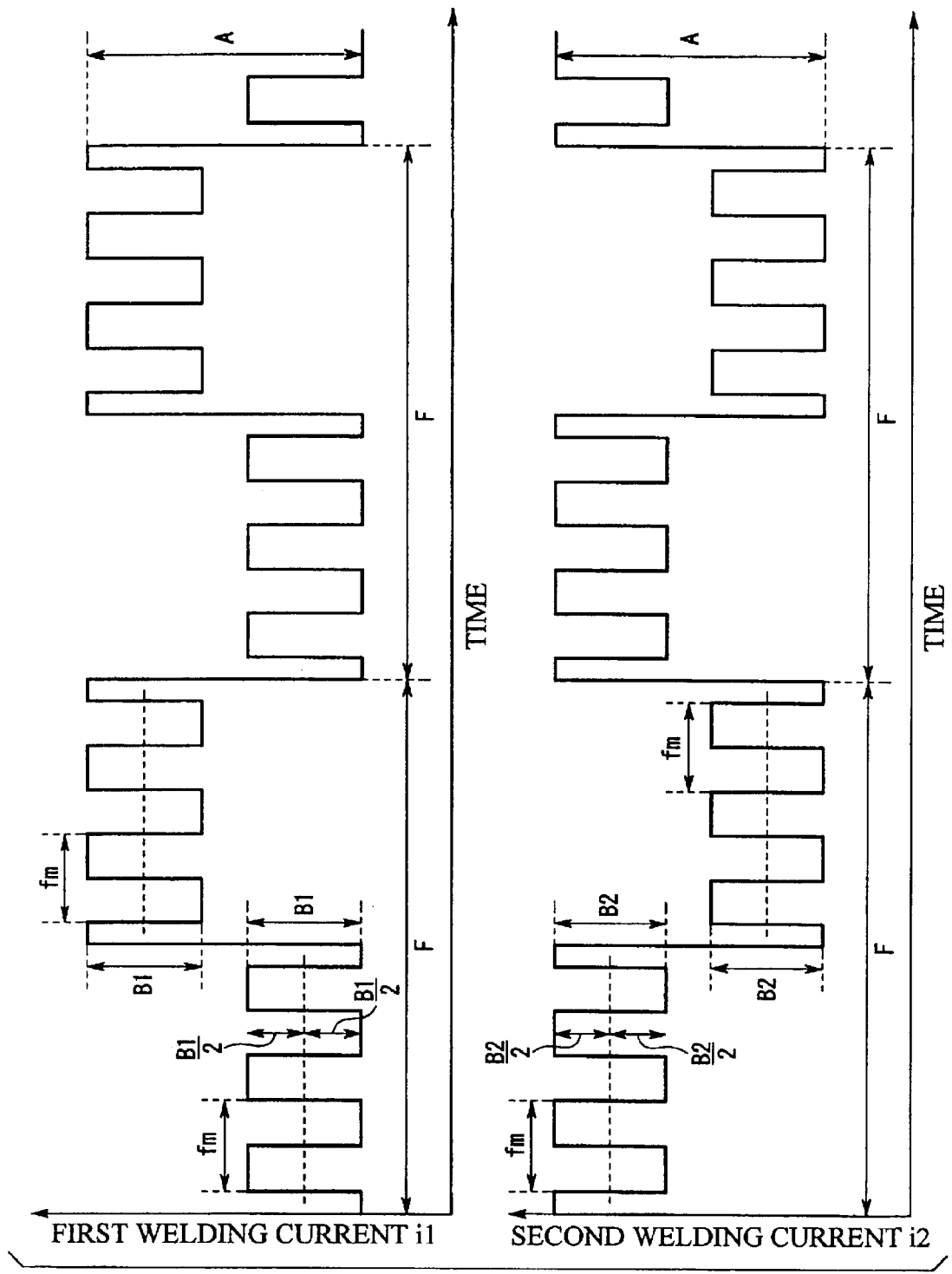
FIG. 2 is a waveform diagram of various welding currents of the TIG welding apparatus according to the embodiment of the present invention.

As shown in FIG. 2, the first welding current i1 and the second welding current i2 are DC currents having a variation resulting from superimposing a intermediate frequency pulse of a period fm on a low frequency pulse of a period F. In other words, the instantaneous current value of the first welding current i1 and the second welding current i2 varies in a low frequency pulse of the period F, and also varies in a intermediate frequency pulse of the period fm. Moreover, since half of each of variable amplitudes B1 and B2 of the intermediate frequency pulse are added to and subtracted from the low frequency pulse prior to superimposing, the average value of the intermediate frequency pulse during half of the interval of the period F is zero. In other words, the current value is not increased by superimposition of the intermediate frequency pulse.

Regarding the direction of the welding torch 1 during welding, the facing direction of the first welding electrode 1a and the second welding electrode 1b is orthogonal to the direction of the welding groove (in other words, the direction of the weld line). If the first welding current i1 and the second welding current i2 with the low frequency pulse variations set to mutually opposite phases as shown in FIG. 2 are applied to the welding torch 1 in this orientation, then when the first welding current i1 is large the second welding current i2 is small, and when the first welding current i1 is small the second welding current i2 is large. Therefore, the electromagnetic attraction of the arcs generated by the electrodes is weak. Consequently, the concentration of the arcs in the welding groove is alleviated. Furthermore, the strength of the first welding current i1 and the second welding current i2 can be alternately changed in the facing gap of the first welding electrode 1a and the second welding electrode 1b.

As a result, the arc constituting the heat source is appropriately dispersed, enabling melting over a wider area of the welding groove. Moreover since the arc is not concentrated at a specific site on the weld pool, the dribbling phenomena of the molten metal due to arc pressure can be effectively inhibited. Such an effect may also be achieved by displacing the welding torch 1 in a direction orthogonal to the welding groove direction, but such displacement of the welding torch 1 is difficult when space within the welding groove is limited.

However in the present TIG welding apparatus, by making the low frequency pulse variation of the first welding current i1 and the low frequency pulse variation of the second welding current i2 opposite phases, the magnetic field in the vicinity of the arc can be varied cyclically to scan the arc. Therefore, the aforementioned effect may be obtained without mechanically displacing the welding torch 1.

Moreover, the phenomena where the arc pressure increases when a intermediate frequency pulse variation is added to a welding current has been verified experimentally. Furthermore, if as in the present TIG welding apparatus, half of the variable amplitude of the intermediate frequency pulse is superimposed in the form of addition to and subtraction from the low frequency pulse, the current value does not increase despite superimposition of the intermediate frequency pulse. As a result, it is possible to increase the arc pressure without increasing the welding current. Therefore a large amount of filler wire may be supplied to improve the welding efficiency.

Here, the present TIG welding apparatus allows adjustment of the variable attributes of the intermediate frequency pulse variation as described below. Firstly, the frequency setting section 2b is used to adjust the repetition frequency of the intermediate frequency pulse variation to a predetermined value within the aforementioned frequency range of approximately 30 to 200 Hz.

This allows fine adjustment of the arc pressure acting on the weld pool.

Secondly, use of the phase difference setting section 2c allows the phase difference between the intermediate frequency pulse variation of the first welding current i1 and the intermediate frequency pulse variation of the second welding current i2 to be set to any desired value. This allows fine adjustment of the degree of concentration of the arc generated between the first welding electrode 1a and the welding groove, and the arc generated between the second welding electrode 1b and the welding groove. As a result, this also allows fine adjustment of the range of the melting in the welding groove, and fine adjustment of the dispersion of the arc pressure due to each arc. For example, if the phase difference is set to 180°, the degree of concentration of the arcs in the welding groove assumes the smallest value. Therefore the range of the melting in the welding groove can be set to the greatest range, and the arc pressure due to each arc is dispersed over the greatest range.

Thirdly, in the present TIG welding apparatus, the variable amplitude B1 (see FIG. 2) of the intermediate frequency pulse variation of the first welding current i1 set by the first variable amplitude setting section 2d, and the variable amplitude B2 of the intermediate frequency pulse variation of the second welding current i2 set by the second variable amplitude setting section 2e, may be set independently. In other words, in the present TIG welding apparatus, the magnitude correlation of the variable amplitude B1 of the intermediate frequency pulse variation of the first welding current i1, and the variable amplitude B2 of the intermediate frequency pulse variation of the second welding current i2, is adjustable.

As a result the arc pressure of the arc of the first welding electrode 1a and the arc pressure of the arc of the second welding electrode 1b can be set independently. Therefore for example in the case of horizontal position welding, dribbling of the molten metal can be effectively inhibited. Dribbling of the molten metal under gravity, in other words, downwards, occurs readily in the case of horizontal position welding. However, by setting the variable amplitude B1 of the welding electrode positioned at the bottom (for example, the first welding electrode 1a) to a value greater than the variable amplitude B2, the arc pressure of the arc of the first welding electrode 1a is set to a value greater than the arc pressure of the arc of the second welding electrode 1b, and dribbling of the molten metal downwards may be more effectively inhibited.

Furthermore, as shown in FIG. 2, the low frequency pulse variation has an alternately repeated duty ratio between high current level and low current level of 50%. However the variable amplitudes B1 and B2 of the intermediate frequency pulse variation for the high current level, and the variable amplitudes B1 and B2 of the intermediate frequency pulse variation for the low current level, may be settable individually if desired. Moreover, the duty ratio between high current level and low current level for the low frequency pulse is not restricted to 50% and may be between 10 and 90%.

According to the present TIG welding apparatus, since the intermediate frequency pulse variation is superimposed on the low frequency pulse variation of the first and second welding currents, it is possible to improve the arc pressure, and thus inhibit dribbling of the molten metal. Furthermore, in addition to this, by adjusting the various variable attributes of the intermediate frequency pulse variation of the first and second welding currents, that is, the frequency, phase difference, and/or amplitude, it is possible to further effectively inhibit dribbling of the molten metal.

Moreover, the welding torch 1 of the present TIG welding apparatus is such that as described above, the outer faces a2 and b2 of the tips a0 and b0 of the first welding electrode 1a and second welding electrode 1b are inclined to form the predetermined tip angles. By shaping the tips a0 and b0 in this manner, the arc of the first welding electrode 1a and the arc of the second welding electrode 1b are positioned such that they are opposed symmetrically around the first welding electrode 1a and the second welding electrode 1b. Consequently, uniform weld penetration at the left and right (or at the top and bottom) centered on the line of the weld can be realized.

Furthermore, the wire supply apparatus 2j of the present TIG welding apparatus supplies filler wire from the front or rear of the welding torch 1 towards the welding groove. According to this welding torch 1, different from the conventional technology in which the filler wire is supplied from between the first welding electrode 1a and the second welding electrode 1b, the gap between the first welding electrode 1a and the second welding electrode 1b can be reduced, thus enabling welding work in a more confined space.

Moreover, as shown in FIG. 2, the phase difference between the first welding current i1 and the second welding current i2 is 180°. However by adjusting this phase difference between 0 to 180°, the amount of electromagnetic attraction of the arc of each electrode can be changed.

What is claimed is:

1. A TIG welding apparatus comprising; a twin electrode type welding torch having a first and a second welding electrode arranged approximately parallel and either side of an insulation plate of a predetermined thickness, and a main unit which supplies to the first welding electrode a first welding current varied at a first period, and to the second welding electrode a second welding current varied at the first period and at an opposite phase to the variation of the first welding current, wherein said main unit superimposes a variation of a second period being shorter than the first period, onto the first and second welding currents.

2. A TIG welding apparatus according to claim 1, wherein said main unit adjusts variable attributes of the second period of the first and second welding currents.

3. A TIG welding apparatus according to claim 2, wherein said main unit adjusts a phase difference between the variation of the second period of the first welding current and the variation of the second period of the second welding current, as one variable attribute of the second period.

4. A TIG welding apparatus according to claim 3, wherein said main unit adjusts a magnitude correlation of the variable amplitude of the second period of the first welding current and the variable amplitude of the second period of the second welding current, as one variable attribute of the second period.

5. A TIG welding apparatus according to claim 2, wherein said main unit adjusts the value of the second period, as one variable attribute of the second period.

6. A TIG welding apparatus according to claim 5, wherein the first and second welding currents are DC currents.

7. A TIG welding apparatus according to claim 1, wherein said first and second welding electrodes are plate electrodes arranged either side of, and approximately parallel to, an insulation plate, with outer faces inclined in relation to faces (inner faces) opposite said insulation plate, in order to form a predetermined tip angle for each.

8. A TIG welding apparatus according to claim 1, wherein there is further provided a wire supply apparatus which pays out filler wire from a direction of movement of the twin electrode type welding torch, or from an opposite direction to movement of the twin electrode type welding torch.

9. A TIG welding apparatus according to claim 1, wherein the variation of the first period is a variation which alternately repeats between a high current level and a low current level, and the main unit sets a variable amplitude of the second period for the high current level, and a variable amplitude of the second period for the low current level, independently.

10. A TIG welding method where welding is performed by supplying to each of a first and a second welding electrode of a twin electrode type welding torch, first and second welding currents with mutually differing phases and which vary in a first period, involving superimposing a variation in a second period being shorter than the first period, on the first and second welding currents.

11. A TIG welding method according to claim 10, involving adjusting the variable attributes of the second period of the first and second welding currents for welding.

12. A TIG welding method according to claim 11, involving adjusting a phase difference between the variation of the second period of the first welding current and the variation of the second period of the second welding current, as one variable attribute of the second period.

13. A TIG welding method according to claim 12, involving adjusting the value of the second period, as one variable attribute of the second period.

14. A TIG welding method according to claim 1, involving adjusting a magnitude correlation of a variable amplitude of the second period of the first welding current and a variable amplitude of the second period of the second welding current, as one variable attribute of the second period.

15. A TIG welding method according to claim 11 which uses plate electrodes for the first and second welding electrodes, arranged either side of, and approximately parallel to, an insulation plate, with outer faces inclined in relation to faces (inner faces) opposite said insulation plate in order to form a predetermined tip angle for each.

16. A TIG welding method according to claim 15, wherein filler wire is payed out from a direction of movement of the twin electrode type welding torch, or from an opposite direction to movement of the twin electrode type welding torch.

17. A TIG welding method according to claim 16, wherein the variation in the first period is a variation which alternately repeats between a high current level and a low current level, and said method independently sets a variable amplitude of the second period for the high current level, and a variable amplitude of the second period for the low current level.

18. A TIG welding method according to claim 17, wherein the first and second welding currents are DC currents.

* * * * *